United States Patent
Lemaire et al.

(10) Patent No.: US 9,169,142 B2
(45) Date of Patent: Oct. 27, 2015

(54) METHOD FOR TREATING WATER WITHIN A SEQUENTIAL BIOLOGICAL REACTOR INCLUDING AN IN-LINE MEASUREMENT OF THE NITRITE CONCENTRATION INSIDE SAID REACTOR

(75) Inventors: Romain Lemaire, Paris (FR); Julien Chauzy, Antony (FR); Kim Sorensen, Jouy sur Morin (FR)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 715 days.

(21) Appl. No.: 13/510,691

(22) PCT Filed: Nov. 8, 2010

(86) PCT No.: PCT/EP2010/067004
§ 371 (c)(1),
(2), (4) Date: Jun. 28, 2012

(87) PCT Pub. No.: WO2011/061084
PCT Pub. Date: May 26, 2011

(65) Prior Publication Data
US 2012/0261335 A1  Oct. 18, 2012

(30) Foreign Application Priority Data
Nov. 20, 2009  (FR) ...................................... 09 58205

(51) Int. Cl.
C02F 3/30  (2006.01)
C02F 3/00  (2006.01)

(52) U.S. Cl.
CPC ................. *C02F 3/006* (2013.01); *C02F 3/307* (2013.01); *C02F 2209/00* (2013.01); *C02F 2209/14* (2013.01); *C02F 2209/15* (2013.01); *Y02W 10/12* (2013.01); *Y02W 10/15* (2013.01)

(58) Field of Classification Search
CPC ...... C02F 3/006; C02F 3/307; C02F 2209/00; C02F 2209/14; C02F 2209/15; Y02W 10/12; Y02W 10/15
USPC .......................... 210/605, 614, 620, 630, 903
See application file for complete search history.

(56) References Cited

U.S. PATENT DOCUMENTS

| 4,425,231 A * | 1/1984 | Fujimoto et al. ............. 210/96.1 |
| 5,266,200 A | 11/1993 | Reid |
| 2006/0283796 A1* | 12/2006 | Tokutomi ...................... 210/631 |

* cited by examiner

*Primary Examiner* — Fred Prince
(74) *Attorney, Agent, or Firm* — Coats and Bennett PLLC (57) ABSTRACT

The invention relates to a method for treating water laden with nitrogen in the form of ammonium by means of nitritation-denitritation, wherein said method includes at least: a first step (i) of supplying at least one sequential biological reactor (10) with said water; an aerated nitration step (ii); an anoxia denitritation step (iii); and a step (iv) of extracting treated water from said reactor. According to the invention, the method also includes the in-line measurement of the nitrite concentration of said water in said reactor, and at least one monitoring step of at least one step of the method, said monitoring step taking into account the results from said in-line measurement of the nitrite concentration.

35 Claims, 3 Drawing Sheets

METHOD FOR TREATING WATER WITHIN A SEQUENTIAL BIOLOGICAL REACTOR INCLUDING AN IN-LINE MEASUREMENT OF THE NITRITE CONCENTRATION INSIDE SAID REACTOR

This application is a U.S. National Stage application of PCT No. PCT/EP2010/067004, with an international filing date of Sep. 8, 2010, and is incorporated herein by reference in its entirety.

1. FIELD OF THE INVENTION

The field of the invention is that of the treatment of water charged with nitrogen in the form of ammonium. The invention can be applied especially in the treatment of industrial or municipal effluents such as anaerobic digester supernates, effluents from the treatment of sludges by wet oxidation, gas treatment condensates, condensates from the treatment of wastewater sludge, discharge lixiviates, slaughterhouse effluents, liquid pig manure or any other type of effluent charged with nitrogen in ammonium form.

More specifically, the invention pertains to a water treatment method implementing a sequential biological reactor (SBR) within which there are successively implemented especially steps of aerated and anoxic biological treatment.

2. PRIOR ART

Biological water treatment methods are commonly used to reduce the nitrogen pollution content of water.

These biological methods include the nitrification-denitrification method implemented in a sequential biological reactor (SBR).

Such a method consists in introducing a water to be treated into a biological reactor within which aerated and anoxic phases are implemented in alternation.

During the aerated phases, the injection of oxygen (in the form of air or pure oxygen for example) into the reactor promotes the growth of an autotrophic nitrifying biomass enabling the conversion of the nitrogen in ammonium form ($NH_4^+$) into nitrates ($NO_3^-$), constituted in fact by a biomass that converts nitrogen in ammonium form ($NH_4^{30}$) into nitrites ($NO_2^-$), called an AOB ("ammonia oxidizing bacteria") biomass, and a biomass that converts the nitrites ($NO_2^-$) into nitrates ($NO_3^-$), called an NOB ("nitrites oxidizing bacteria") biomass.

During the anoxic phases, the stopping of the aeration of the reactor promotes the growth of a denitrifying biomass which reduces the nitrates to molecular nitrogen gas (diazote) $N_2$ in passing through the nitrite stage. This denitrifying biomass is heterotrophic in nature, i.e. it cannot grow except in the presence of a source of organic carbon.

Figure 1:
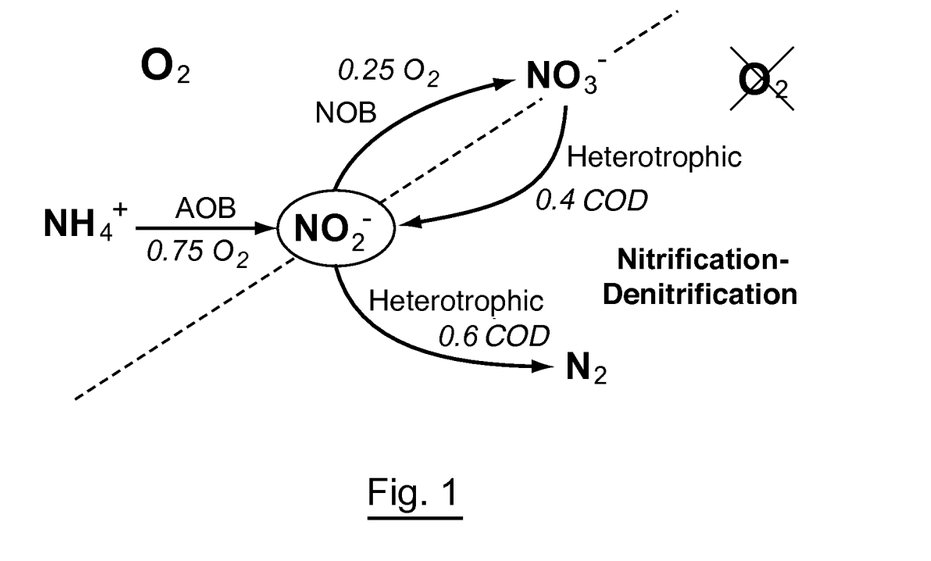
FIG. 1 is a diagram relating to a prior-art method for reducing nitrogen pollution by nitrification-denitrification.

This method of reducing nitrogen pollution by nitrification-denitrification is shown schematically in FIG. 1.

A biological treatment method of this kind is particularly efficient because its implementation leads to a non-negligible reduction of the nitrogen pollution content of water. However, it has some drawbacks. In particular, its implementation requires the injection into the reactor of a relatively large quantity of oxygen to ensure the conversion of the ammonium into nitrates. Furthermore, most of the water to be treated has an organic pollution content (BOD or Biochemical Oxygen Demand) that is far too low to enable the satisfactory reduction of nitrogen pollution by nitrification-denitrification. It is thus often necessary to inject carbon into the reactor in the form of reagents (for example an easily biodegradable carbonaceous substrate) so that the heterotrophic type bacteria can ensure the elimination of the nitrates in satisfactory quantities.

Such a method of treatment by nitrification-denitrification is thus relatively costly to implement because of the fairly high consumption of oxygen and of carbon reagent that it entails.

In order to at least partially mitigate these drawbacks, a method has been developed aimed at reducing pollution in ammonium form by minimizing the formation of nitrates. This method, known as nitritation-denitritation is also called the "nitrates-shunt" method and consists of the introduction of water to be treated into a sequential biological reactor within which there are alternately implemented aerated phases and anoxic phases in operational conditions providing selective pressure promoting the growth of AOB bacteria to the detriment of the NOB bacteria. These operational conditions may be a high concentration of ammonium ($NH_4^+$), low concentration of dissolved oxygen during the aerated phases, temperature above 28° C., a low sludge age or several operational conditions combined.

During the aerated phases, the injection of oxygen into the reactor enables the growth of AOB type bacteria which act on the ammonia nitrogen ($NH_4^+$) to form nitrites ($NO_2^-$). The use of a sequential biological reactor gives high ammonium concentrations after each sequence of feeding the reactor with water for treatment. Since the NOB bacteria are more inhibited than the AOB bacteria by high ammonium concentrations, their growth is limited. Besides, the oxygen is injected so as to preferably maintain a low concentration of dissolved oxygen in the reactor, in order to promote the growth of AOB bacteria to the detriment of NOB bacteria because of a greater affinity for oxygen on the part of the AOB bacteria. The production of nitrates from nitrites by the NOB biomass is thus limited.

During the anoxic phases, the role of the heterotrophic biomass is essentially that of converting the nitrites into molecular nitrogen, the nitrate content being low. This heterotrophic biomass Competes with the NOB biomass for the consumption of nitrites and contributes to limiting the growth of the NOB biomass.

Figure 2:
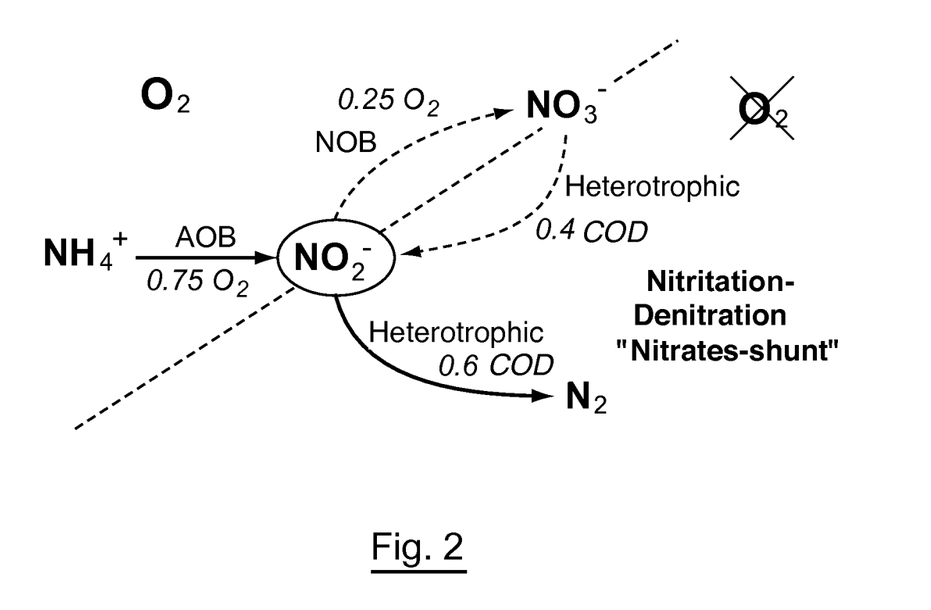
FIG. 2 is a diagram relating to a prior-art method for reducing nitrogen pollution by "nitrates-shunt" nitritation-denitritation.

This method of reducing nitrogen pollution by "nitrates-shunt" is shown schematically in FIG. 2.

The implementation of such a nitritation-denitritation method, as compared with a classic nitrification-denitrification method described in FIG. 1, reduces oxygen consumption by about 25% and carbon reagent consumption by about 40%. It thus achieves satisfactory reduction of the nitrogen pollution of water in a more economical way.

There is another biological method known in the prior art called the "nitritation-deammonification" method. This method further reduces the cost inherent in the treatment of the nitrogen pollution of water.

In such a method, water to be treated is introduced into a sequential biological reactor within which aerated phases and anoxic phases are implemented in alternation, in minimizing the formation of nitrates by selective operational conditions and implementing a specific biomass known as an "anammox" biomass.

During the aerated phases, the implementation of the same operational conditions as those described here above for the "nitrates-shunt" method enables the selection of AOB bacteria to the detriment of the NOB bacteria and minimizes the production of nitrates from nitrites by the NOB biomass.

During the anoxic phases, anammox type bacteria grow and act on the ammonium ions and on the nitrites to form molecular nitrogen gas ($N_2$) as well as a small quantity of nitrates without consuming organic carbon since these are autotrophic bacteria, unlike the heterotrophic biomass responsible for the denitritation step in the "nitrates-shunt" method.

When the denitritation step, consisting of the degradation of nitrites into molecular nitrogen gas ($N_2$) form involves anammox type bacteria, this step known as a denitritation step is more precisely called deammonification.

The implementation of such a "nitritation-deammonification" method, as compared with a classic "nitrification-denitrification" method, reduces oxygen consumption by about 60% and carbon reagent consumption by about 90%. It thus reduces the nitrogen pollution of water satisfactorily and even more economically.

Figure 3:
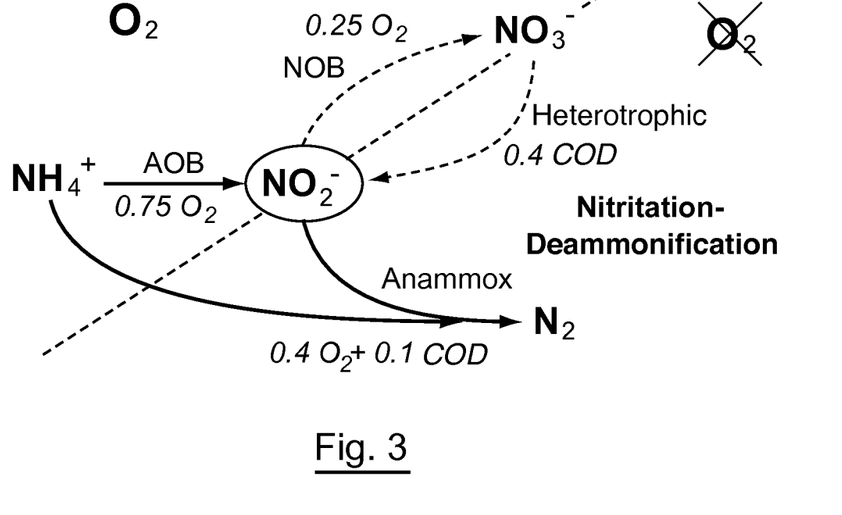
FIG. 3 is a diagram relating to a prior-art method for reducing nitrogen pollution by nitritation-deammonification.

This method for reducing nitrogen pollution by "nitritation-deammonification" is shown schematically in FIG. 3.

When implementing the "nitrate-shunt" and "nitritation-deammonification" methods, several parameters are generally monitored so as to manage the progress of the different reactions that they involve.

The international patent application WO-A1-2007/014994 describes a method for treating water by nitritation-denitritation within a sequential biological reactor during which the following are measured:
- the conductivity and the flow rate of the effluent to be treated;
- the concentration of dissolved $O_2$, the pH and the redox potential in the reactor so as to determine the minimum number of phases for feeding the reactor, the duration of the aeration and anoxic phases as well as the quantities of carbon reagent that have to be supplied.

The French patent application FR-A1-2921917 describes a method for water treatment by nitritation-deammonification within a sequential biological reactor during which the following are measured:
- the flow rate, the conductivity, the temperature and the pH of the effluent to be treated to determine the charge to be treated in nitrogen and the number of treatment sequences to be performed;
- the concentration of dissolved oxygen, the conductivity, the temperature, the pH and the concentration of ammonium in the reactor to monitor the progress of the biological process during the aeration and non-aeration phases and determine their duration;
- the conductivity and the flow rate of the water treated to determine the efficiency of the treatment and adjust the method retroactively.

The implementation of these practices of managing enables efficient reduction of the nitrogen pollution content of the water while at the same time improving control over oxygen and carbon reagent consumption.

3. DRAWBACKS OF THE PRIOR ART

However, the implementation of these principles of managing does not make it possible to optimize the duration of the aeration and anoxic phases and thus that of the full cycle in the SBR. Consequently, it cannot be used to adjust, as a function of need, either oxygen consumption or carbonaceous substrate consumption when necessary (i.e. when implementing a "nitrates-shunt" type method).

Indeed, in these prior-art techniques, this adjustment entails the measuring of a certain number of variables to know the state of progress of the reaction in the biological reactor. These techniques are therefore relatively complex to implement and draw upon numerous techniques of measurement.

Furthermore, the measured variables do not provide for precise knowledge of the state of the method, i.e. the state of progress of the biological processes implemented (nitritation, denitritation, deammonification) as well as the state of progression of the reduction of the nitrogen pollution.

In other words, although the implementation of these principles of managing leads to improving control over the "nitrates-shunt" type and "nitritation-deammonification" type treatment methods, it does not enable carbon reagent consumption to be adjusted as a function of oxygen consumption needs when necessary, or make it possible to optimize the duration of the aeration and anoxic phases, hence the duration of the full cycle in the SBR so as to implement the biological processes involved in an optimal way.

4. GOALS OF THE INVENTION

The invention is aimed especially at overcoming these drawbacks of the prior art and improving the performance of the "nitrates shunt" and "nitritation-deammonification" type treatment methods, each comprising a nitrate-forming (nitritation) step and a nitrite-degrading (denitritation) step.

More specifically, it is a goal of the invention, in at least one embodiment, to provide a technique of water treatment by nitritation-denitritation, the performance and reliability of which are improved as compared with the techniques of the prior art.

In particular, it is a goal of the invention, in at least one embodiment of the invention, to procure a technique of this kind that enables improved mastery over the biological processes implemented in water treatment by nitritation-denitritation.

It is yet another goal of the invention, in at least one embodiment, to provide a technique of this kind that is more economical to implement than the prior-art techniques.

More specifically, it is a goal of the invention, in at least one embodiment, to implement a technique of this kind that makes it possible to adjust carbon reagent consumption, when necessary, as a function of the oxygen consumption needs and to optimize the duration of the feeding, aeration and anoxic phases, hence the duration of the full cycle in the SBR. It is a goal of the invention thus to optimize the total duration of a cycle.

It is yet another goal of the invention, in at least one embodiment, to provide a technique of this kind that makes it possible to reduce the volume of the sequential biological reactor as compared with the prior-art techniques for equal quantities of water to be treated.

5. SUMMARY OF THE INVENTION

These goals as well as others that shall appear here below are achieved according to the invention by means of a method for treating water charged with nitrogen in ammonium form, said method comprising at least:
- a first step (i) for feeding said sequential biological reactor with said water;
- an aerated nitritation step (ii);
- an anoxic denitritation step (iii);
- a step (iv) for extracting treated water from said reactor;
- an in-line measurement of the concentration of nitrites of said water present in said reactor;
- at least one step for monitoring at least one step of the method, said step for monitoring taking account of the results of said in-line measurement of the concentration of nitrites.

Thus, the invention relies on a wholly innovative approach which consists of the implementing, in a method of water treatment by nitritation-denitritation, of an in-line measurement of the concentration of nitrites in the water present in the sequential biological reactor within which the nitritation and denitritation reactions take place, with the aim of achieving more efficient mastery over the biological processes involved in such treatment.

Indeed, knowledge of the concentration of nitrites in the water present in the reactor gives a precise reaction on the state of the method, i.e. on the level of progress of the biological processes implemented as well as the state of progression of the reduction of the nitrogen pollution. In other words, knowledge of this information provides for the most efficient monitoring and handling of the progress of these processes and/or other steps of the method and hence optimizes its performance.

The nitrites concentration is measured in-line, i.e. it is done directly on the production site and not in a laboratory after taking samples.

This measurement can be done directly, i.e. by means of a probe directly measuring the concentration of nitrite ions in solution or indirectly, i.e. for example by means of a probe measuring the oxidized forms of nitrogen in solution (also called NOX) as well as the nitrate ions and, from this measurement, deducing the nitrites concentration by computation.

As understood in the invention, denitritation is a step during which nitrites are degraded into molecular nitrogen gas. This degradation may involve heterotrophic and/or anammox type bacteria. When the denitritation step involves anammox type bacteria, it is more specifically called "deammonification".

The feeding and aeration steps can be implemented concomitantly in order to reduce the duration of the treatment.

A method according to the invention may comprise a unique cycle comprising a feeding of the reactor with all the water to be treated, a nitritation, a denitritation and an extraction of the treated water. According to another approach, a method according to the invention may comprise a plurality of sub-cycles each comprising a feeding of the reactor with a portion only of the water to be treated, a nitritation and a denitritation. Several sub-cycles are then successively implemented until the entire volume of water to be treated has been introduced into and treated in the reactor. The treated water can then be extracted from the reactor.

According to an advantageous characteristic, such a method comprises a step for monitoring said feeding step.

Knowledge of the concentration of nitrites in the reactor makes it possible indeed to efficiently monitor the feeding of water to the reactor so that the implementation of the method is optimized.

In this case, a method according to the invention preferably comprises an in-line measurement of the concentration of ammonium ions in said water present in said reactor, said step for monitoring said step for feeding comprising the following steps:
  computing the sum of said concentration of nitrites and said concentration of ammonium ions;
  comparing said sum with a first predetermined threshold value;
  stopping said step for feeding as soon as said sum is greater than said first threshold value.

It has been observed that a high concentration of ammonium within the reactor necessarily gives rise to a high concentration of nitrites within the reactor. This is because AOB-type bacteria convert the ammonium into nitrites.

In addition, it has been observed that, when the concentration of nitrites within the reactor is excessively great, the AOB-type biomass involved in the nitritation is inhibited by the nitrous acid ($HNO_2$) which is in chemical equilibrium with the nitrites in aqueous phase.

Thus, knowing the concentration of nitrites within the reactor makes it possible to stop the feeding of the reactor with ammonium-charged water so that the nitritation is not inhibited and so that the cleansing performance of the method is not affected.

According to an advantageous characteristic, such a method comprises a step for monitoring the duration of said aerated nitritation step.

Knowing the concentration of nitrites in the reactor indeed enables efficient monitoring of the aeration of the reactor so that the implementation of the method is optimized.

In this case, said step for monitoring the duration of said aerated nitritation step comprises the following steps:
  comparing said concentration of nitrites with a second predetermined threshold value;
  stopping said aerated nitritation step as soon as said concentration of nitrites is greater than said predetermined threshold value.

It has been observed that when the concentration of nitrites in the reactor becomes great during the step of aeration of the reactor, the AOB-type biomass involved in the nitritation is inhibited. Knowledge of the concentration of nitrites in the reactor makes it possible to stop the aeration of the reactor and to initiate an anoxic phase as soon as its value becomes such that it would cause an inhibition of the AOB-type biomass. The nitrites produced will then be degraded into molecular nitrogen gas because of the activity of the heterotrophic bacteria or anammox bacteria during said anoxic phase.

According to another advantageous characteristic, a method of this kind comprises a step for monitoring the duration of said anoxic denitritation step.

Knowledge of the concentration of nitrites in the reactor indeed enables efficient monitoring of the duration of the anoxic phase so that the implementation of the method is optimized.

In this case, said step for monitoring the duration of said anoxic denitritation step preferably comprises the following steps:
  comparing said concentration of nitrites with a third predetermined threshold value;
  stopping said anoxic denitritation step as soon as said concentration of nitrites is smaller than said third predetermined threshold value.

Furthermore, the inventors have noted that, when the concentration of nitrites within the reactor becomes excessively low, the kinetics of the denitritation reaction become slower. It can therefore be preferable to stop the anoxic phase in order to always have the highest possible kinetics of nitrite consumption. Thus, as soon as the concentration of nitrites in the reactor reaches a predetermined low threshold, the anoxic step has to be stopped and the next step can start. The inventors have observed that the fact of terminating the anoxic phase before the concentration of nitrites is zero improves the cleansing performance of the method by maximizing the kinetics of nitrite consumption during the anoxic phase.

According to a first embodiment, said anoxic denitritation step comprises a step for placing said water in contact with heterotrophic bacteria.

The method according to the invention then works in a "nitrates-shunt" configuration: the ammonium is converted into nitrites by AOB bacteria and then the nitrites are converted into molecular nitrogen gas by heterotrophic bacteria.

In this case, said anoxic denitritation step comprises a step for injecting carbon into said reactor, said method furthermore comprising a step for monitoring said step for injecting carbon, said step for monitoring said step for injecting carbon comprising the following steps:
comparing said concentration of nitrites with a fourth predetermined threshold value;
stopping said step carbon input step as soon as said concentration of nitrites is below said fourth threshold value.

To convert the nitrites into molecular nitrogen gas, the heterotrophic bacteria consume organic carbon. However, certain types of water to be treated have a relatively low organic carbon content. It is then necessary to inject a carbonaceous substrate into the reactor during the anoxic phases. The inventors have noted that, if the addition of such a carbonaceous substrate into the reactor is excessively great, this easily biodegradable carbonaceous substrate will not be totally consumed during the corresponding anoxic phase and the oxygen injected into the reactor during the following aerated phase will be used chiefly by the heterotrophic bacteria to reduce this excess carbonaceous substrate, and not by the AOB bacteria to form nitrites from ammonium. In this case, it is noted that, in the next aerated phase, the kinetics of nitrite formation diminish greatly but also that there is a great increase in the quantity of sludges formed by the swift development of heterotrophic bacteria, as well as an excessive consumption of oxygen. In addition, an excessively great injection of carbonaceous substrate induces high costs of operation. Thus, the fact of stopping the injection of carbon into the reactor when the nitrite concentration becomes smaller than a predetermined threshold makes it possible to adjust the quantities of carbon injected into the reactor according to need and to prevent overdosing and these negative consequences during the next aerated phase. The costs inherent in the injection of carbon, the injection of oxygen and the discharge of the excess sludge produced are thus reduced and the cleansing performance of the method is secured. In addition, the duration of the steps of the method is reduced. This produces an equal quantity of treated water while at the same time reducing the size of the biological reactor implemented for this purpose.

According to a preferred non-exhaustive variant, said first threshold value ranges from 1 mg N/L to 400 mg N/L and advantageously from 50 mg N/L to 250 mg N/L, said second threshold value ranges from 1 mg $N-NO_2/L$ to 250 mg $N-NO_2/L$ and advantageously from 10 mg $N-NO_2/L$, to 120 mg $N-NO_2/L$, said third threshold value ranges from 0 mg $N-NO_2/L$ to 120 mg $N-NO_2/L$ and advantageously from 0 mg $N-NO_2/L$ to 50 mg $N-NO_2/L$, and said fourth threshold value ranges from 0 mg $N-NO_2/L$ to 120 mg $N-NO_2/L$ and advantageously from 0 mg $N-NO_2/L$ to 50 mg $N-NO_2/L$.

According to a second embodiment, said anoxic denitritation step comprises a step for placing said water in contact with anammox bacteria.

The method according to the invention then works in a nitritation-deammonification configuration: a part of the ammonium ions is converted into nitrites by AOB bacteria, and then the nitrites and the rest of ammonium ions are converted into molecular nitrogen gas by anammox bacteria.

The water to be treated may or may not be alkalinity-deficient according to the value of its Total Alkalinity (TA).

When the water to be treated is alkalinity-deficient, the conditions prevailing within the reactor enable the total conversion into nitrites of the ammonia contained in the volume of water for treatment that is introduced into it.

In this case, said aerated nitritation step (ii) is followed by a second step for feeding without aeration comprising the following steps:
computing the ratio of said concentration of ammonium to said concentration of nitrites;
comparing said ratio with a fifth threshold value;
stopping said second step (i) for feeding as soon as said ratio is greater than said fifth threshold value.

The entire ammonium of the first portion of water for treatment introduced into the reactor is converted into nitrites at the end of the first feeding. A second feeding is then implemented. This is stopped as soon as the concentration of ammonium and of nitrites within the reactor is propitious to the treatment of ammonium and nitrites by the anammox bacteria. A denitritation step implementing anammox bacteria can then be implemented.

When the water to be treated is alkalinity-deficient, the pH enabling the AOB bacteria to work cannot be maintained. The conditions prevailing within the reactor then do not enable the total conversion into nitrites of the ammonia contained in the volume of water for treatment introduced into this reactor.

In this case, said step for monitoring said aerated nitritation step (ii) furthermore comprises the following steps:
computing the ratio of said concentration of ammonium to said concentration of nitrites;
comparing said ratio with a fifth threshold value;
stopping said aerated nitritation step (ii) as soon as said concentration of nitrites is greater than said second predetermined anammox threshold value or when said ratio is smaller than said fifth threshold value.

The nitritation is then stopped as soon as the concentrations of ammonium and nitrites inside the reactor are suited to the treatment of ammonium and nitrites by the anammox bacteria and before the threshold of inhibition of the AOB and anammox bacteria is reached.

Preferably, said first threshold value ranges from 1 to 300 mg N/L and advantageously from 10 to 200 mg N/L, said second threshold value ranges from 1 to 150 mg $N-NO_2/L$ and advantageously from 1 to 100 mg $N-NO_2/L$, said third threshold value ranges from 0 to 100 mg $N-NO_2/L$ and advantageously from 0 to 50 mg $N-NO_2/L$, said fifth threshold value ranges from 0.6 to 1.2 and advantageously from 0.6 to 1.

The invention also pertains to a water treatment plant comprising at least:
one sequential biological reactor;
means for feeding water to said reactor;
means for aerating said reactor;
means for monitoring said means for feeding water to said reactor and said means for aerating said reactor,
said means for monitoring comprising means for in-line measurement of the concentration of nitrites in said water present in said reactor.

6. LIST OF FIGURES

Other features and advantages of the invention shall appear more clearly from the following description of different preferred embodiments, given by way of simple, illustrative and non-exhaustive examples, and from the appended drawings, of which.

7. DESCRIPTION OF ONE EMBODIMENT OF THE INVENTION

7.1. Reminder of the Principle of the Invention

The general principle of the invention relies on the implementation, in a method for treating water charged with nitrogen in the form of ammonium by nitritation-denitritation, of a step for in-line measurement of the concentration of nitrites in the water present in the sequential biological reactor within which the nitritation and denitritation reactions take place and at least one step for monitoring at least one step of the method, said monitoring step taking account of the results of said in-line measurement of the concentration of nitrites in order to more efficiently control the biological processes involved in said treatment.

The inventors have shown that knowledge of the nitrite concentration in the water present in the reactor gives a precise indication of the state of the method, i.e. on the level of progress of the biological processes implemented as well as the state of progression of the reduction of the nitrogen pollution. In other words, knowledge of this information makes it possible to manage the progress of these processes more efficiently.

7.2. Example of a Plant According to the Invention

Figure 4:
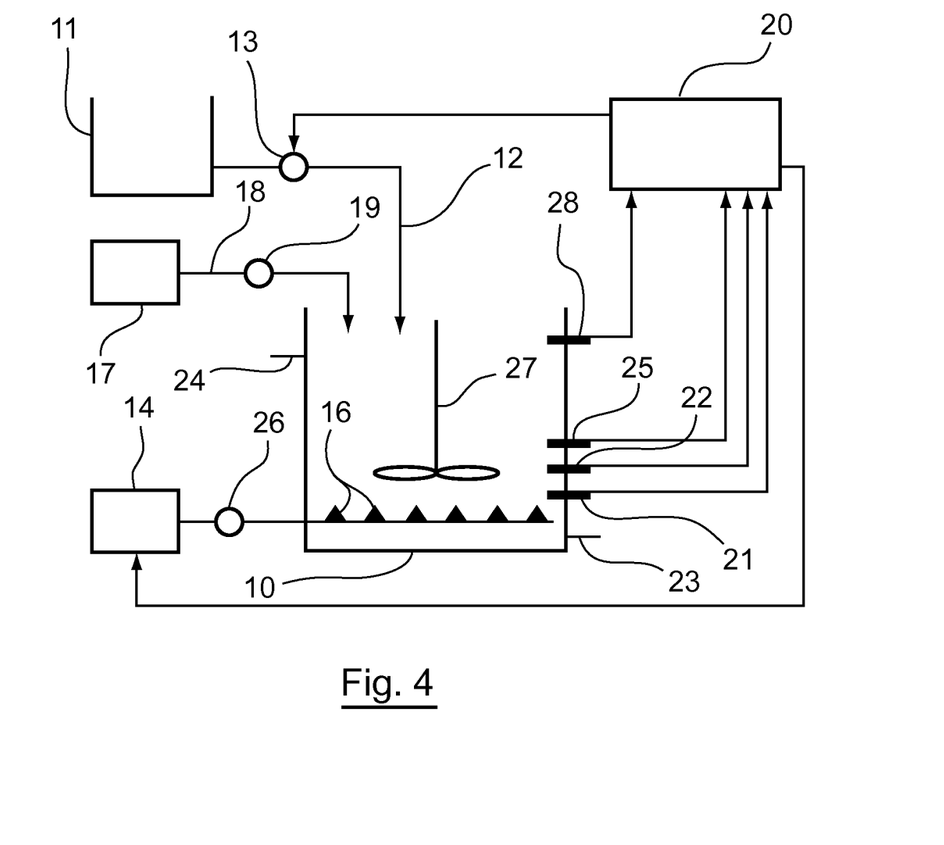
FIG. 4 represents a water treatment plant according to the invention.

Referring to FIG. 4, we present an embodiment of an installation for treating water according to the invention.

As represented in this FIG. 4, an installation of this kind comprises a means for feeding water to a stirred sequential biological reactor 10.

The feeding means comprise:
- a buffer tank 11, housing a stirrer 27, designed to contain water to be treated enriched with nitrogen in ammonium form;
- a feed piping 12 which places the buffer tank 11 in connection with the sequential biological reactor 10, and
- a pump 13 which, depending on whether or not it is implemented, enables the feeding or non-feeding of water for treatment to the sequential biological reactor 10.

Aeration means enable the injection of oxygen into the sequential biological reactor 10. These aeration means comprise a blower 14 and an oxygen regulation valve 26 which are connected via a piping 15 to air diffusers 16. These air diffusers 16 are housed in a lower part of the sequential biological reactor 10.

Carbon injection means enable the injection of the carbonaceous substrate into the sequential biological reactor 10. These injection means comprise a tank 17 designed to contain the carbonaceous substrate, an injection piping 18 connecting the tank 17 and the sequential biological reactor 10, and a pump 19 which, depending on whether or not it is implemented, enables the injection or non-injection of this substrate into this sequential biological reactor 10.

This plant comprises means for monitoring means for feeding water to the sequential biological reactor 10, means for aerating the sequential biological reactor 10 and means for injecting carbon into the sequential biological reactor.

These monitoring means comprise a control cabinet 20, which could for example comprise a microcontroller or a computer as well as an ammonium ion probe 21 and a nitrite probe 22 and an oxygen probe 25 which are designed to enable measurement of the concentrations of ammonium, nitrites and oxygen in the water contained in the sequential biological reactor 10. The control cabinet 20 is designed to compare the measurements made by means of the ammonium probe 21, nitrite probe 22 and oxygen probe 25 and then compare them with threshold values and handle the implementation of the pump 13, the pump 19, the blower 14 and the $O_2$ regulation valve 26 accordingly as explained in greater detail here below. The sequential biological reactor 10 has a sludge extraction piping 23 and a piping 24 for extracting treated water. The implementation of the oxygen probe enables the oxygen concentration in the reactor to be regulated. The oxygen regulation could for example work on set values: in the aerated phase, when the value measured on the oxygenated probe is greater than a set value, the cabinet activates the oxygen regulation valve so that less oxygen is delivered into the SBR. Conversely, when the value measured at the oxygen probe is smaller than the set value, the cabinet directs the oxygen regulation valve so that more oxygen is delivered into the SBR. In practice, this set value will range from 0.1 to 3 mg $O_2$/L.

In one variant not shown, the sequential biological reactor of an installation of this kind may or may not include a pH probe, a nitrate probe, a temperature probe. In this case, the measurement of the pH can be transmitted to the control cabinet so as to monitor the injection of reagent into the reactor to modify the pH of the water to be treated.

In one variant not shown, the ammonium probe may be replaced by a conductivity probe. It is indeed well known to those skilled in the art that, from the conductivity of the water situated in the sequential biological reactor, it is possible to deduce its approximate ammonium concentration.

7.3 Examples of Methods According to the Invention

7.3.1 "Nitrate-shunt" Configuration

A method according to the invention for treating water charged with nitrogen in ammonium form, implementing a nitrate-shunt type process, shall now be described.

In this embodiment, the treatment method consists in treating water in successive portions of the total volume to be treated.

According to such a method, the sequential biological reactor 10 is supplied with water for treatment. To this end, the control cabinet 20 manages the implementation of the pump 13 so that the water for treatment contained in the buffer tank 11 is shed through the feed piping 12 into the sequential biological reactor 10.

The control cabinet 20, working in parallel, i.e. during the phase for feeding the reactor, manages the implementing of the blower 14 and that of the oxygen control valve 26 so that oxygen is introduced into the sequential biological reactor 10 through the piping 15 and the air diffusers 16.

An activity of the AOB bacteria is then observed inside the sequential biological reactor 10. The water to be treated contained in the sequential biological reactor 10 thus undergoes an aerated nitritation step.

During the nitritation, the AOB bacteria act on the ammonium ions present in the water contained in the sequential biological reactor 10 to form nitrites by consuming oxygen.

The concentrations of nitrites and ammonium are measured in-line by the implementation of the control cabinet 20 and the nitrite probe 22 and ammonium probe 21. In one variant, it is possible that these measurements will be done not continuously but for example at regular frequencies. The nitrites probe 22 enables the in-line measurement of the concentration of nitrites in the water contained in the sequential biological reactor 10.

The feeding of water to the reactor is monitored. During this monitoring of the feeding, the control cabinet 20:
  computes the sum of the concentration of nitrites and the concentration of ammonium;
  compares the sum with a first threshold value equal to 100 mg N/L.

As soon as this sum is greater than the first threshold value, the control cabinet 20 stops the working of the pump 13 so that the feeding of water for treatment to the sequential biological reactor 10 is stopped.

The duration of the aerated nitritation step is monitored. During this monitoring, the control cabinet 20 compares the nitrites concentration with the second predetermined threshold value equal to 50 mg N—NO2/L.

As soon as the nitrites concentration is greater than said second predetermined threshold value, the control cabinet directs the blower 14 and the oxygen regulation valve 26 so that it no longer delivers oxygen into the sequential biological reactor 10. Consequently, the aerated nitritation step comes to an end.

An activity of the heterotrophic bacteria is then observed inside the sequential biological reactor 10. The water for treatment contained in the sequential biological reactor thus undergoes an anoxic denitritation step.

During the denitritation, the heterotrophic bacteria act on the nitrites present in the water contained in the sequential biological reactor 10 to form molecular nitrogen gas in consuming the carbonaceous substrate present in the sequential biological reactor 10.

The anoxic denitritation step comprises a step for carbon input into the sequential biological reactor 10. This carbon input is monitored. During the monitoring of the carbon input, the control cabinet 20 compares the concentration of nitrites with a fourth predetermined threshold value equal to 10 mg N—NO2/L.

As soon as the concentration of nitrites is smaller than this fourth threshold value, the control cabinet directs the pump 19 so that the injection of carbon into the sequential biological reactor 10 is stopped. The injected carbon may take the form of a liquid, a solution of methanol, ethanol or glycerol or any other carbonaceous substrate.

The duration of the anoxic denitritation step is monitored. During this monitoring, the control cabinet 20 compares the concentration of nitrites with a third predetermined threshold value equal to 2 mg N—NO2/L.

As soon as the concentration of nitrites gets below this third predetermined threshold value, the control cabinet 20 leads the anoxic denitritation step to a stop.

Further steps of feeding, aerated nitritation and then anoxic denitritation are implemented so as to treat a new portion of the total volume of water to be treated. In this embodiment, the treatment method therefore comprises several sub-cycles each comprising a feeding step, an aerated nitritation step and an anoxic denitritation step. A plurality of sub-cycles is implemented until the high level 28 of the biological reactor 10 is attained.

As soon as all the volume of water is treated, i.e. as soon as the high level 28 of the biological reactor 10 is attained, the stirring within the sequential biological reactor 10 is stopped so that the water contained in the reactor undergoes a decantation. The suspended matter is then separated from the treated water. When the decantation is terminated, the phases of extraction (water and sludges) start. The sludges formed during this decantation are extracted from the reactor through the extraction piping 23. The treated water is extracted from the reactor through the extraction piping 24.

In this embodiment, one complete treatment cycle, i.e. a cycle enabling the treatment of the entire volume of water to be treated (volume defined by the high level 28 of the reactor 10) therefore comprises several sub-cycles (feeding, aerated nitritation and anoxic denitritation), a decantation and an extraction of treated water and sludges. The extraction of the sludges enables checks on the sludge age of the method.

In this embodiment, the feeding of water, the injection of carbon and the injection of oxygen into the sequential biological reactor are monitored at least by the measurement of the nitrites through the nitrite measurement probe 22. In variants, it is possible to monitor only certain of these parameters.

In one variant, the entire volume of water to be treated can be introduced into the sequential biological reactor 10 only once. In this case, only one sub-cycle will be implemented.

7.3.2. Nitritation-deammonification Configuration 7.3.2.1 Case of an Effluent Non-deficient in Alkalinity A description shall now be given of a method according to the invention for treating water non-deficient in alkalinity, charged with nitrogen in ammonium form, implementing a process of the nitritation/deammonification type by means of anammox bacteria in only one sequential biological reactor.

In this embodiment, the method of treatment consists in treating the water by successive portions of the total volume to be treated.

According to such a method, the sequential biological reactor 10 is supplied with water for treatment during a first feeding step. To this end, the control cabinet 20 manages the use of the pump 13 so that the water for treatment contained in the buffer tank 11 is shed through the feed piping 12 into the sequential biological reactor 10.

The control cabinet 20 manages the use of the blower 14 and the oxygen regulation valve 26 in parallel so that oxygen is introduced into the sequential biological reactor 10 through the piping 15 and the air diffusers 16.

An activity of the AOB bacteria is then observed inside the sequential biological reactor 10. The water to be treated contained in the sequential biological reactor 10 thus undergoes an aerated nitritation step in which the AOB bacteria are involved.

During the nitritation, the AOB bacteria act on the ammonium ions present in the water contained in the sequential biological reactor 10 to form nitrites by consuming oxygen.

The concentrations of nitrites and ammonium are measured in-line by means of the control cabinet 20 and the nitrite probe 22, ammonium probe 21 and oxygen probe 25. The nitrites probe 22 enables the in-line measurement of the concentration of nitrites in the water contained in the sequential biological reactor 10. The ammonium measurement probe 21 enables the in-line measurement of the concentration of nitrites in the water contained in the sequential biological reactor 10.

The feeding of water to the reactor is monitored. During this monitoring of the feeding, the control cabinet 20:
  computes the sum of the concentration of nitrites and the concentration of ammonium;
  compares the sum with a first threshold value equal to 100 mg N/L.

As soon as this sum is greater than the first threshold value, the control cabinet 20 stops the working of the pump 13 so that the feeding of water for treatment to the sequential biological reactor 10 is stopped.

The duration of the aerated nitritation step is monitored. During this monitoring, the control cabinet 20 compares the concentration of nitrites with a second predetermined threshold value equal to 0 mg N—NO2/L.

As soon as the concentration of nitrites is greater than said second predetermined threshold value, the control cabinet manages the blower 14 and the oxygen regulation valve 26 so that it no longer delivers oxygen into the sequential biological reactor 10. Consequently, the aerated nitration step comes to an end.

A second feeding operation, without aeration, is performed. The second feeding of water to the reactor is monitored. During this monitoring of the feeding operation, the control cabinet 20:
computes the ratio of the concentration of ammonium to the concentration of nitrites;
compares the ratio with said fifth threshold value equal to 0.8.

As soon as the ratio is greater than said fifth threshold value, the control cabinet 20 stops the working of the pump 13 so that the feeding of water to be treated to the sequential biological reactor 10 is stopped.

The concentrations of ammonium and nitrites are then suitable for the treatment of the ammonium and nitrites contained in the effluent. An activity of the anammox bacteria is then observed inside the sequential biological reactor 10. The water to be treated contained in the sequential biological reactor 10 thus undergoes an anoxic deammonification step.

During the anoxic phases, the anammox bacteria act on the ammonium and on the nitrites present in the water to form molecular nitrogen gas.

The duration of the anoxic deammonification step is monitored. During this monitoring, the control cabinet 20 compares the concentration of nitrites with the third predetermined threshold value equal to 2 mg N—NO2/L.

As soon as the concentration of nitrites is below this predetermined threshold value, the control cabinet 20 leads the anoxic deammonification step to a stop.

Further steps of first feeding, aerated nitration, second feeding and then anoxic deammonification are carried out so as to treat a new portion of the total volume of water to be treated. In this embodiment, the treatment method therefore comprises several sub-cycles each comprising a first feeding step, an aerated nitration step, a second non-aerated feeding step and an anoxic deammonification step. A plurality of sub-cycles is implemented until the high level 28 of the biological reactor 10 is attained during a first and a second feeding step. This high level stops the feeding and activates a last anoxic deammonification step.

As soon as the entire volume of water is treated, i.e. as soon as the high level 28 of the biological reactor 10 has been reached and as soon as the last anoxic phase has taken place, the stirring within the sequential biological reactor 10 is stopped so that the water contained in this reactor undergoes a decantation. The suspended matter in the water is then separated from the water. The sludges formed during this decantation are extracted from the reactor through the extraction piping 23. The treated water is extracted from the reactor through the extraction piping 24.

In this embodiment, a full treatment cycle therefore comprises at least one sub-cycle (first feeding operation, aerated nitration, second feeding operation and anoxic deammonification), a decantation and an extraction of treated water and sludges. The extraction of sludges makes it possible to monitor the sludge age of the method.

In one variant, the entire volume of water to be treated could be introduced into the sequential biological reactor 10 twice, implementing only one sub-cycle.

7.3.2.2 Case of an Alkalinity-deficient Effluent

A description shall now be given of a method according to the invention for treating alkalinity-deficient water charged with nitrogen in ammonium form, implementing a process of the nitration/deammonification type by means of anammox bacteria in only one sequential biological reactor.

In this example, the effluent is alkalinity deficient in such a way that the total nitration of the ammonia into nitrite is not possible, the quantity of alkalinity available in the effluent being insufficient to maintain a pH enabling the AOB bacteria to function.

In this embodiment, the method of treatment consists in treating the water by successive portions of the total volume to be treated.

According to such a method, the sequential biological reactor 10 is supplied with water for treatment. To this end, the control cabinet 20 manages the use of the pump 13 so that the water for treatment contained in the buffer tank 11 is shed through the feed piping 12 into the sequential biological reactor 10.

The control cabinet 20 manages the use of the blower 14 and the oxygen regulation valve 26 in parallel so that oxygen is introduced into the sequential biological reactor 10 through the piping 15 and the air diffusers 16.

An activity of the AOB bacteria is then observed inside the sequential biological reactor 10. The water to be treated contained in the sequential biological reactor 10 thus undergoes an aerated nitration step in which the AOB bacteria are involved.

During the nitration, the AOB bacteria act on the ammonium ions present in the water contained in the sequential biological reactor 10 to form nitrites by consuming oxygen.

The concentrations of nitrites and ammonium are measured in-line by means of the control cabinet 20 and the nitrite probe 22, ammonium probe 21 and oxygen probe 25. The nitrites probe 22 enables the in-line measurement of the concentration of nitrites in the water contained in the sequential biological reactor 10. The ammonium measurement probe 21 enables the in-line measurement of the concentration of nitrites in the water contained in the sequential biological reactor 10.

The feeding of water to the reactor is monitored. During this monitoring of the feeding, the control cabinet 20:
computes the sum of the concentration of nitrites and the concentration of ammonium;
compares the sum with a first threshold value equal to 100 mg N/L.

As soon as this sum is greater than the first threshold value, the control cabinet 20 stops the working of the pump 13 so that the feeding of water for treatment to the sequential biological reactor 10 is stopped.

The duration of the aerated nitration step is monitored. During this monitoring of the feeding operation, the control cabinet 20:
compares the concentration of nitrites with a second predetermined threshold value equal to 50 mg N—NO2/L;
computes the ratio of the concentration of ammonium to the concentration of nitrites and compares it with a fifth threshold value equal to 0.8.

As soon as the concentration of nitrites is higher than said second predetermined threshold value or the ratio of the concentration of ammonium to the concentration of nitrites is lower than said fifth threshold value, the control cabinet 20 manages the blower 14 and the oxygen regulation valve 26 so that it no longer delivers oxygen into the sequential biological reactor 10. Consequently, the aerated nitration step comes to an end.

The concentrations of ammonium and nitrites are then suitable for the treatment of the ammonium and nitrites contained in the effluent. An activity of the anammox bacteria is then observed inside the sequential biological reactor 10. The water to be treated contained in the sequential biological reactor 10 thus undergoes a further anoxic deammonification step.

During the anoxic phases, the anammox bacteria act on the ammonium and on the nitrites present in the water to form molecular nitrogen gas.

The duration of the anoxic deammonification step is monitored. During this monitoring, the control cabinet 20 compares the concentration of nitrites with said third predetermined threshold value equal to 2 mg N—NO2/L.

As soon as the concentration of nitrites is below this third predetermined threshold value, the control cabinet 20 leads the anoxic deammonification step to a stop.

Further steps of feeding, aerated nitritation, second feeding and then anoxic deammonification are carried out so as to treat a new portion of the total volume of water to be treated. In this embodiment, the treatment method therefore comprises several sub-cycles each comprising a feeding step, an aerated nitritation step and an anoxic deammonification step. A plurality of sub-cycles is implemented until the high level 28 of the biological reactor 10 is attained during a feeding step. This high level stops the feeding and activates a last aerated nitritation step and a last anoxic deammonification step.

As soon as the entire volume of water is treated, i.e. as soon as the high level 28 of the biological reactor 10 is reached and as soon as the last aerated nitritation phase and last anoxic deammonification phase have taken place, the stirring within the sequential biological reactor 10 is stopped so that the water contained in this reactor undergoes a decantation. The suspended matter in the water is then separated from the water. The sludges formed during this decantation are extracted from the reactor through the extraction piping 23. The treated water is extracted from the reactor through the extraction piping 24.

In this embodiment, a full treatment cycle therefore comprises at least one sub-cycle (feeding, aerated nitritation, anoxic deammonification), a decantation and an extraction of treated water and sludges. The extraction of sludges makes it possible to monitor the sludge age of the method.

In one variant, the entire volume of water to be treated could be introduced into the sequential biological reactor 10 only once.

7.4. Trial

Trials were conducted so as to highlight the efficiency of a technique according to the invention.

These trials consisted in treating an effluent by the nitrates-shunt method within a 500-liter SBR.

All the steps of the treatment were done in a same reactor in a sequenced manner with a maximum volume of effluent for treatment of 215 liters added per full cycle. The temperature was 25° C. and the dissolved oxygen concentration during the aerated phases was low (0.5 mgO$_2$/L) in order to favor the shunt in the SBR. This SBR was fed with filtrates from the draining table coming from the dehydration of the digested sludges of an anaerobic digester of a cleansing station. The average composition of the filtrate is presented in the table below.

|  | N—NH$_4$ (mgN/L) | Soluble COD (mg/L) | P—PO$_4^{3-}$ (mgP/L) | SM (mg/L) | TA (° F.) | pH |
|---|---|---|---|---|---|---|
| Min | 239 | 96 | 90 | 38 | 107 | 7.4 |
| Max | 721 | 218 | 145 | 1568 | 281 | 8.1 |
| Mean | 466 | 147 | 109 | 216 | 163 | 7.68 |
| Standard deviation | 127 | 24.2 | 12.2 | 284 | 43 | 0.2 |
| Number of samples | 88 | 53 | 22 | 37 | 24 | 23 |

Figure 5:
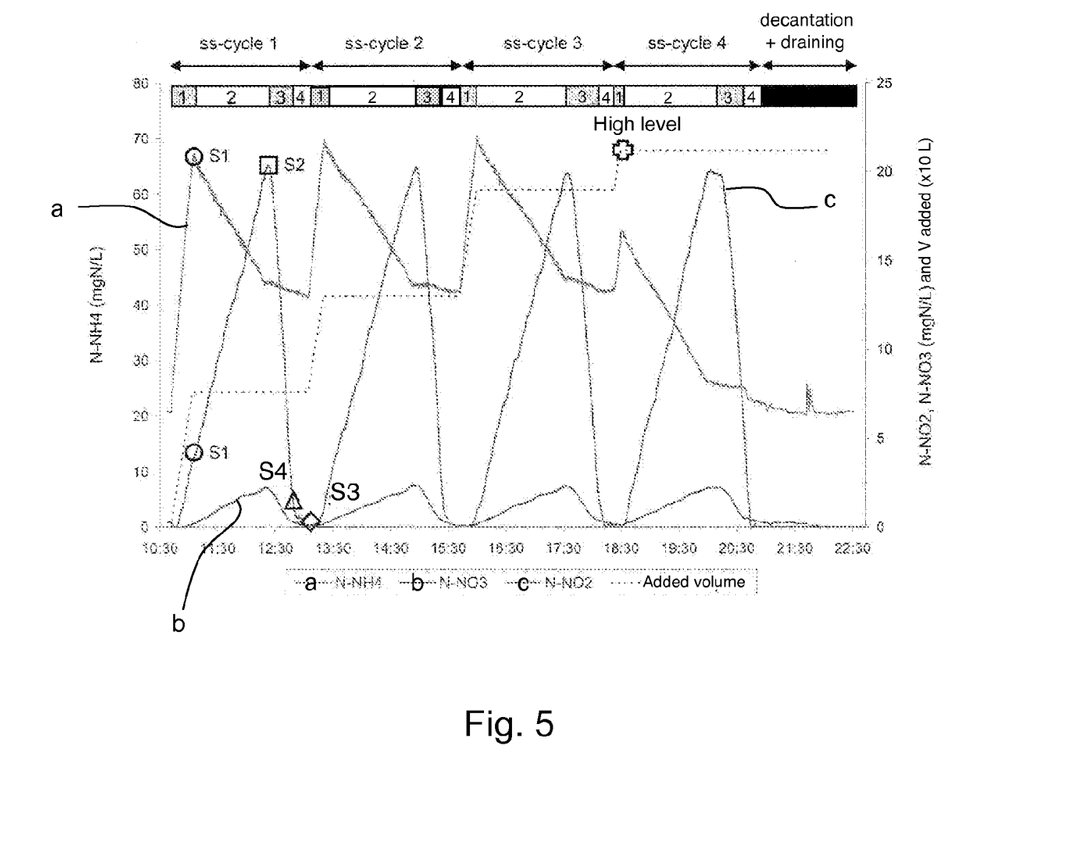
FIG. 5 illustrates the profiles of concentration of $NH_4$, $NO_2$ and $NO_3$ in a reactor as well as the volume of effluent to be treated added into the reactor during a trial for treating an effluent by implementing a nitrates-shunt method according to the invention comprising four sub-cycles.

FIG. 5 illustrates the profiles of concentration of NH$_4$, NO$_2$ NO$_3$ in the reactor as well as the volume of effluent for treatment added to the reactor during the treatment of the effluent by the implementation of the method according to the invention by the nitrates-shunt method comprising four sub-cycles.

As shown, each sub-cycle comprises:
- an aerated phase (1) for feeding the reactor (during which the nitritation commences);
- an aerated phase (2) (during which the nitritation continues);
- an anoxic phase (3) with ethanol doping (during which the denitritation commences);
- an anoxic phase (4) without ethanol doping (during which the denitritation continues).

The value of, the first threshold S1, corresponding to the sum of the concentration of N—NH$_4$ and N—NO$_2$ in the reactor beyond which the feeding of the reactor is stopped and its aeration continues alone, was equal to 70 mg N/L.

The value of, the second threshold S2, corresponding to the concentration of NO$_2$ in the reactor, beyond which the aeration of the reactor is stopped and the anoxic phase begins, was equal to 20 mg N—NO$_2$/L.

The value of, the fourth threshold S4, corresponding to the concentration of NO$_2$ in the reactor, below which the anoxic phase with carbonaceous substrate doping is stopped and the anoxic phase without carbonaceous substrate doping starts, was equal to 2 mg N—NO$_2$/L.

The value of, the third threshold S3, corresponding to the concentration of NO$_2$ in the reactor, below which the anoxic phase with carbonaceous substrate doping is stopped and the feeding phase of the following sub-cycle is initiated, was equal to 1 mg N—NO$_2$/L.

The four sub-cycles follow on one other in sequence as a function of the values of the thresholds defined in the regulator until the high value is attained in the sequential biological reactor during a feeding step.

Once the high level is reached in the reactor, the sub-cycle during which the high level of the reactor is attained, in this case the fourth sub-cycle, continues. This sub-cycle is followed by a decantation step, and then a step for draining the treated effluent which marks the end of the full cycle.

The volume of water added into the reactor at each sub-cycle can be different and depends on the concentration of NH$_4$ in the reactor.

At the last step of aeration of the reactor, a step for drawing off the sludge is implemented so as to monitor the age of the sludges present in the reactor.

The results of this trial highlighted the fact that the application of a method according to the invention causes the formation of NO$_3$ in the reactor to be very sharply limited and therefore avoids the treatment of water in the reactor by nitrification-denitrification, favoring instead treatment by nitritation-denitritation.

The invention claimed is:

1. A method of treating water to reduce ammonium pollution in the water, comprising:
   a. establishing first, second, third, fourth, and fifth threshold values;
   b. commencing a feeding of water to be treated into a reactor;
   c. commencing aeration of the water in the reactor;
   d. sensing, continuously or at intervals, one or more process variables including nitrite concentration in the reactor;
   e. based on at least nitrite concentration and one or more comparisons involving one or more of the first, second, third, fourth, and fifth threshold values, adjusting one or more of:
      (1) an amount of oxygen in the water by controlling the aeration of the water,
      (2) an amount of carbon in the water by controlling injection of a carbonaceous substrate into the reactor, and
      (3) the amount of water in the reactor by controlling the feeding of water to be treated into the reactor
      so as to reduce ammonium concentration by a process that includes nitritation followed by a subsequent sub-process.

2. The method of claim 1 wherein one of the one or more process variables is ammonium concentration, the method further including:
   a. determining elemental nitrogen concentration in the water from the nitrite and ammonium concentrations;
   b. comparing the elemental nitrogen concentration with the first threshold value;
   c. stopping the feeding of water to be treated in the reactor upon the elemental nitrogen concentration becoming greater than the first threshold value;
   d. comparing the nitrite concentration in the water with the second threshold value; and
   e. upon the nitrite concentration in the water becoming greater than the second threshold value, ending nitritation by stopping aeration.

3. The method of claim 2 wherein the subsequent sub-process is denitritation and the method further includes:
   a. commencing denitritation and starting injection of carbonaceous substrate into the water;
   b. comparing nitrite concentration in the water with the third threshold value;
   c. ending denitritation upon nitrite concentration becoming less than the third threshold value wherein ending denitritation also includes comparing the nitrite concentration in the water with the fourth threshold value and ending injection of the carbonaceous substrate into the water upon the nitrite concentration in the water becoming less than the fourth threshold value.

4. The method of claim 3 including decanting treated water from the reactor and removing sludge from the reactor.

5. The method of claim 3 wherein the first threshold value ranges from about 1 mg N/L to about 400 mg N/L.

6. The method of claim 3 wherein the second threshold value ranges from about 1 mg N—$NO_2$/L to about 250 N—$NO_2$/L.

7. The method of claim 3 wherein the third and fourth threshold values each range from about 0 mg N—$NO_2$/L to about 120 N—$NO_2$/L.

8. The method of claim 2 wherein the subsequent sub-process includes deammonification, the method further including:
   a. initiating deammonification amd commencing a further feeding of water to be treated into the reactor;
   b. computing a ratio of ammonium concentration and nitrite concentration;
   c. comparing the ratio with the fifth threshold value;
   d. upon the ratio becoming greater than the fifth threshold value, stopping the further feeding of water into the reactor;
   e. comparing the nitrite concentration with the third threshold value; and
   f. upon the nitrite concentration becoming less than the third threshold value, stopping deammonification.

9. The method of claim 8 including decanting treated water from the reactor and removing sludge from the reactor.

10. The method of claim 8 wherein deammonification supports activity of anammox bacteria in the water to form molecular nitrogen gas from ammonium and nitrites.

11. The method of claim 2 wherein denitritation supports activity of heterotropic bacteria to form molecular nitrogen gas from nitrites.

12. The method of claim 1 wherein nitritation supports activity of ammonia oxidizing bacteria in the water such that the ammonia oxidizing bacteria act on ammonium in the water to form nitrites.

13. The method of claim 1 wherein nitritation retards activity of nitrites oxidizing bacteria such that the activity of nitrites oxidizing bacteria to form nitrates is limited.

14. A method treating water to reduce ammonium pollution in the water, comprising:
   a. performing a series of treatment cycles in a reactor, each cycle comprising an aerated nitritation phase followed by a subsequent phase and including:
      i. starting a flow of water to be treated into the reactor;
      ii. commencing the aerated nitritation phase by starting aeration of the water;
      iii. continuously or at intervals determining nitrite concentration in the water;
      iv. continuously or at intervals determining elemental nitrogen concentration in the water;
      v. upon elemental nitrogen concentration in the water becoming greater than a first threshold value, stopping the flow of water to be treated;
      vi. upon the nitrite concentration in the water becoming greater than a second threshold value, ending the aerated nitritation phase by stopping the aeration of the water.

15. The method of claim 14 wherein the subsequent phase includes denitritation, each cycle further including:
   a. initiating the denitritation phase and starting an injection of a carbonaceous substrate into the water;
   b. upon the nitrite concentration in the water becoming less than a third threshold value, ending the denitritation phase, wherein ending the denitritation phase includes stopping the carbon aqueous substrate injection into the water upon nitrite concentration becoming less than a fourth threshold value; and
   c. determining the level of water in the reactor and, if the level of water is less than a selected level, performing an additional treatment cycle or, in the alternative, ending the series of treatment cycles.

16. The method of claim 15 including decanting treated water from the reactor and removing sludge from the reactor.

17. The method of claim 14 wherein the subsequent phase includes deammonification and the method further includes:
   a. initiating deammonification and commencing a further feeding of water into the reactor;

b. computing a ratio of ammonium concentration and nitrite concentration;

c. comparing the ratio with a fifth threshold value;

d. upon the ratio becoming greater than the fifth threshold value, stopping the further feeding of water into the reactor;

e. comparing the nitrite concentration with a third threshold value;

f. upon the nitrite concentration becoming less than the third threshold value, stopping deammonification; and g. determining the level of water in the reactor and, if the level of water is less than a selected level, performing an additional treatment cycle or, in the alternative, ending the series of treatment cycles.

18. The method of claim 17 including decanting treated water from the reactor and removing sludge from the reactor.

19. The method of claim 17 wherein the first threshold value ranges from about 1 mg N/L to about 300 mg N/L.

20. The method of claim 17 wherein the second threshold value ranges from about 1 mg $N-NO_2/L$ to about 150 $N-NO_2/L$.

21. The method of claim 17 wherein the third threshold value ranges from about 0 mg $N-NO_2/L$ to about 100 $N-NO_2/L$.

22. The method of claim 17 wherein the fifth threshold value ranges from about 0.6 to about 1.2.

23. A system for treating water to reduce ammonium pollution in the water, comprising:

a. an incoming water buffer device for receiving, holding, and discharging water to be treated;

b. a reactor in fluid communication with the buffer device for receiving water discharged from the buffer device;

c. an aeration device for aerating water held in the reactor;

d. a carbon injection device in fluid communication with the reactor for injecting carbonaceous substrate into the reactor;

e. a series of sensors, each sensor for sensing a particular process variable, the series of sensors including:

i) an ammonium probe configured to sense ammonium in the water held in the reactor and to produce a signal from which ammonium concentration in the water can be computed, ii) a nitrite probe configured to sense nitrite in the water held in the reactor and to produce a signal from which nitrite concentration in the water can be computed, iii) a water level sensor configured to sense a water level in the reactor;

f. a controller for:

i) receiving signals from the sensors, ii) performing computations of at least ammonium and nitrite concentrations, and iii) selectively producing control signals for controlling the:

(1) flow of water from the buffer device to the reactor, (2) injection of carbonaceous substrate into the reactor from the carbon injection device, and (3) aeration of water in the reactor by the aeration device.

24. The system of claim 23 wherein the controller includes inputs for receiving data for determining a plurality of threshold values of elemental nitrogen and nitrite concentrations.

25. The system of claim 23 wherein the buffer device includes a buffer tank in fluid communication with a first pump for discharging water into the reactor.

26. The system of claim 23 wherein the carbon injection device includes a substrate tank in fluid communication with a second pump for injecting the carbonaceous substrate into the reactor.

27. The system of claim 23 wherein the aeration device includes a blower and an oxygen regulation valve configured in fluid communication with a source of an oxygen-containing gas and with a diffuser disposed in the reactor, the aeration device for providing a flow of oxygen-containing gas into the water.

28. A method of treating water, comprising:

a. feeding water to be treated into a reactor;

b. treating the water by sequential processes that include nitritation and denitritation;

c. sensing one or more process variables, including nitrite concentration in the water;

d. based, at least, on the nitrite concentration in the water and on a comparision of the nitrite concentration with one or more of a plurality of threshold values of nitrate concentration, adjusting one or more of:

i. the amount of water in the reactor;

ii. an amount of oxygen in the water;

iii. an amount of carbon in the water to control whether the process is nitritation or denitritation; and e. aerating the water in the reactor until the nitrite concentration exceeds one of the pluralilty of threshold values.

29. The method of claim 28 wherein the reactor comprises a sequential biological reactor.

30. The method of claim 28 including stopping the feeding of water into the reactor when the nitrite concentration exceeds one of the plurality of threshold values.

31. The method of claim 28 including injecting carbon into the water in the reactor until the nitrite concentration is less than one of the pluralilty of threshold values.

32. The method of claim 28 including stopping the treating of the water when the nitrite concentration is less than one of the plurality of threshold values.

33. A method for treating water having ammonium, comprising:

a. a water treatment process with at least two process steps selected from the group of process steps including:

i) performing aerated nitritation, ii) performing denitritation, iii) performing deammonification, and b. a measurement process that includes in-line determination of at least one process variable selected from the group of process variables that includes:

i) nitrite concentration in the water, ii) ammonium concentration in the water iii) a ratio of the ammonium and nitrite concentrations;

c. at least one control step selected from the group of control steps that includes:

i) feeding water to be treated into the reactor, ii) stopping the feeding of water to be treated into the reactor, iii) aerating the water, iv) stopping the aeration of the water, v) injecting carbon into the water, and vi) stopping the injection of carbon in the water;

d. extracting treated water from the reactor;

e. wherein the process step includes nitritation, the measurement process includes determining nitrite concentration and ammonium concentration, and wherein the control steps include feeding water to be treated into the reactor, aerating the water, and stopping the feeding of water in response to the sum of nitrate and ammonium concentrations exceeding a first threshold value; and f. wherein the process steps include denitritation beginning after nitritation ends, and wherein the control steps include stopping aeration and injecting carbon in response to the nitrite concentration exceeding a second threshold value.

34. The method of claim 33 wherein the control steps include stopping the injection of carbon in response to nitrite concentration falling below a fourth threshold value, and wherein denitritation ends when nitrite concentration falls below a third threshold value.

35. The method of claim 33 wherein the process steps include deammonification beginning after nitritation ends, the measurement process includes determining the ratio of the ammonium and nitrite concentrations, and the control steps include stopping aeration, feeding water after nitritation ends, and stopping the feeding of water when the ratio falls below a fifth threshold value, and further including deammonification ending when the nitrite concentration falls below the third threshold value.

\* \* \* \* \*